United States Patent [19]

Rabinovich

[11] Patent Number: 4,840,653

[45] Date of Patent: Jun. 20, 1989

[54] FABRICATION OF HIGH-SILICA GLASS ARTICLE

[75] Inventor: Eliezer M. Rabinovich, Berkeley Heights, N.J.

[73] Assignee: American Telephone and Telegraph Company, AT&T Bell Laboratories, Murray Hill, N.J.

[21] Appl. No.: 246,954

[22] Filed: Sep. 19, 1988

Related U.S. Application Data

[63] Continuation-in-part of Ser. No. 17,905, Feb. 24, 1987, abandoned, which is a continuation-in-part of Ser. No. 774,666, Sep. 11, 1985, abandoned, which is a continuation of Ser. No. 743,268, Jun. 10, 1985, abandoned, which is a continuation-in-part of Ser. No. 564,181, Dec. 22, 1983, abandoned.

[51] Int. Cl.$^4$ ............................................. C03B 37/016
[52] U.S. Cl. ..................................... 65/3.12; 65/3.11; 65/18.2; 65/18.4; 65/901; 65/DIG. 16; 264/1.5; 423/338; 423/341

[58] Field of Search .................... 65/3.11, 3.2, 18.2, 65/18.4, DIG. 16, 901; 264/1.5; 423/338, 341

[56] References Cited

U.S. PATENT DOCUMENTS

| | | | |
|---|---|---|---|
| 4,323,381 | 4/1982 | Matsuyama et al. | 65/901 |
| 4,419,115 | 12/1983 | Johnson, Jr. et al. | 65/901 |
| 4,495,297 | 1/1985 | Puyane et al. | 65/901 |
| 4,605,428 | 8/1986 | Johnson, Jr. et al. | 65/17 |
| 4,680,046 | 7/1987 | Matsuo et al. | 65/901 |
| 4,707,174 | 11/1987 | Johnson, Jr. et al. | 65/961 |

Primary Examiner—Arthur Kellogg
Attorney, Agent, or Firm—Bernard Tiegerman

[57] ABSTRACT

Incorporation of fluorine into a porous silica body, such as an unsintered body produced by a sol-gel method, by VAD or OVPO, reduces or eliminates bubble or pore formation upon re-heating of the glass formed by sintering of the porous material. Effective fluorine concentrations are between 0.01 and 5% by weight. The invention can be used advantageously in producing preforms and optical fiber.

6 Claims, No Drawings

FABRICATION OF HIGH-SILICA GLASS ARTICLE

CROSS-REFERENCE TO RELATED APPLICATION

This is a continuation-in-part of application Ser. No. 017,905 filed by E. M. Rabinovich on Feb. 24, 1987, now abandoned, which is a continuation-in-part of application Ser. No. 774,666 filed by K. Nassau, E. M. Rabinovich and D. L. Wood on Sept. 11, 1985, which is a continuation of application Ser. No. 743,268 filed by D. W. Johnson, Jr., J. B. MacChesney, E. M. Rabinovich, and E. M. Vogel on June 10, 1985 now abandoned, which is a continuation-in-part of application Ser. No. 564,181, filed Dec. 22, 1983, now abandoned.

FIELD OF THE INVENTION

This invention pertains to methods for producing high-silica glass and high-silica glass articles. In particular, it pertains to methods resulting in formation of a porous high-silica intermediate body, e.g., the sol-gel method.

BACKGROUND OF THE INVENTION

High-silica glasses have wide commercial application, in part because of their refractory properties, low thermal expansion, high thermal shock resistance, good chemical resistance, and good dielectric insulating properties when low in alkali-oxides. Recently, very pure high-silica glasses have been fabricated, and such glasses have been successfully applied to produce extremely low-loss optical fibers for communication systems.

High-silica glasses are made primarily by melting of appropriate starting materials, by the sol-gel method, or by depositing the glassy product of appropriate gas phase reactions. This application is concerned only with the second method and a subgroup of the third method, the subgroup comprising the so-called Vertical Axial Deposition (VAD) method, and the Outside Vapor Phase Oxidation (OVPO) method. The glassforming methods of concern in this application have the common feature that a porous intermediate body exists at some point during glass manufacture, and that this intermediate body is at some later stage heat treated to result in a dense glass body. The glass body is then typically reheated to at least a sintering temperature, and may be subjected to a shape-changing treatment, e.g., fiber drawing. Such heating treatment of the glass body will be referred to herein as "re-heating".

Although the fusion method of glass fabrication is probably the most widely used method, the sol-gel method of producing high-silica glasses can actually have significant advantages over the former. See, for instance, commonly assigned U.S. Pat. No. 4,419,115, incorporated herein by reference. For a description of the VAD and the OVPO methods, see T. Izawa et al., 1977 *International Conference on Integrated Optics and Optical Fiber Communication*, (Tokyo, Japan), pp. 375–378; and U.S. Pat. No. 3,806,570 issued to J. S. Flamenbaum et al., respectively.

Several variants of the sol-gel method for forming high-silica glass are known in the art. Among these are processes comprising hydrolysis and polymerization of a metal alkoxide, and processes that use particulates such as fumed silica in sol-formation. Alkoxide processes are described, for instance, in the chapter by S. Sakka in Treatise on Materials Science and Technology, Vol. 22, M. Tomozawa and R. H. Doremus, editors, Academic Press, 1982, pp. 129–167. For an example of the particulate method, see, for instance, U.S. Pat. No. 4,042,361, which discloses a method of densifying fumed silica involving drying a flowable sol of silicate to form a fragmented solid which is then calcined, milled to provide a slip for casting silica articles which are then fused by heating to temperatures above the liquidus.

Fabrication of high-silica glass articles often comprises a manufacturing step in which the prepared glass is heated to a temperature above the softening temperature. For instance, optical fiber is typically produced by drawing from a glass body, generally called a preform, the drawing typically requiring heating part of the preform to a temperature of the order of 2200° C. It has been observed in the prior art that glass produced by a sol-gel method is subject to bubble formation or reboil, also sometimes called bloating, during such high temperature treatment. Bubble or pore formation can also occur in VAD and OVPO-produced glass. See, for instance, K. Ishida et al., *Fiber and Integrated Optics*, Vol. 4, No. 2, Crane, Russak & Co. (1982), pp. 191–202.

Bubble formation is a highly undesirable phenomenon that typically requires rejection of affected articles. For instance, bubbles in such articles as optical fiber, lenses, prisms, or other optical elements result in light scattering that makes such articles generally unacceptable.

U.S. Pat. Nos. 3,954,431 and 4,011,006, co-assigned with this, teach, inter alia, that the inclusion of small quantities of $GeO_2$ in borosilicate glass suppresses bubble formation. It is also known that execution of an exacting heating routine during sintering, or sintering in a He-atmosphere, can reduce bubble formation during subsequent higher temperature manufacturing steps.

However, due to the economic potential of high quality sol-gel, VAD, and OVPO high-silica glass, the availability of a broadly applicable, simple, and reliable method for eliminating bubble formation would be highly desirable. This application discloses such a method.

The prior art knows many elements and compounds that can be incorporated into high-silica glass to produce changes in the physical characteristics of the glass. For instance, germanium is an important dopant in glass for optical fibers, since it results in an increase of the refractive index of silica without causing optical absorption at wavelengths of current interest. Another well-known dopant is fluorine, which lowers the refractive index of silica, in addition to markedly decreasing its viscosity and lowering its glass transition temperature. See, for instance, W. Eitel, *Silicate Sciences*, Vol. VIII, paragraph 95, page 54, Academic Press, 1976; K. Abe, *Proceedings of the Second European Conference on Optical Fiber Communications*, IEE, 59–61, Paris, France, 1976; and K. Rau et al., *Topical Meeting on Optical Fiber Transmission II*, Williamsburg (1977), pp. TUC 4-1 to TUC 4-4.

SUMMARY OF THE INVENTION

We have invented a method for reducing or preventing bubble formation during re-heating of high-silica glass formed from a porous highsilica intermediary. The inventive method comprises forming a body comprising porous silica and heating at least part of the porous silicacomprising body to a sintering temperature, thereby producing a body comprising high-silica glass. The method further comprises introducing, prior to completion of the glass-producing heat treatment, fluorine into at least a part of the silica-comprising body such that the fluorine concentration in the silica glass produced by the heat treatment is at least about 0.01% b.w.

The fluorine concentration typically is less than about 5% by weight (b.w.), and preferably is between about 0.1% and 2% b.w. The fluorine is introduced prior to or during sintering of the porous silicacomprising body, e.g., in the sol-gel method during gel formation, by impregnation of the undried gel, by impregnation of the dried, i.e., unsintered or partially sintered gel body, or during the sintering treatment; or in VAD or OVPO during sintering. The fluorine can be in elemental form or be derived from appropriate fluorine containing compounds. The compounds can be gaseous, liquid, or solid, in the latter case they are preferably soluble in, e.g., water or alcohol.

In a high-silica glass article according to the invention an effective level of fluorine is present, (at least prior to re-heating,) throughout the part of the glass body that is to be re-heated. For instance, in a preform (or optical fiber) according to the invention an effective level of fluorine is present both in the cladding material and in the core material. This distinguishes inventive preforms (and fiber) from the prior art, in which fluorine is commonly used to depress the clad refractive index, but is typically not incorporated into the fiber core.

"Articles" according to the invention are intended to include both final products such as optical fibers and intermediate glass bodies such as consolidated preforms.

DETAILED DESCRIPTION

As was mentioned above, the sol-gel method for producing high silica glass, i.e., glass comprising more than about 50% b.w. $SiO_2$, typically more than about 80% b.w., potentially has advantages over other common production methods. For instance, it is often easier to produce glass bodies of high purity by the sol-gel process than by melting, since the porous nature of the gel body facilitates purification by contact with appropriate gaseous reactants, e.g., chlorine treatment to remove $OH^-$. Conversely, the sol-gel method is also well suited to producing doped (uniformly or nonuniformly) glass bodies. An example of a nonuniformly doped body is an optical fiber preform.

Since very high purity and nonuniform doping typically cannot be achieved by the melt process of glass making, bodies having these properties are presently typically produced by processes involving deposition of glassy material formed in an appropriate gas phase reaction. Although these processes (e.g., OVPO, VAD, etc.) are by now highly refined, they are typically relatively slow and thus expensive. The sol-gel process has the potential of producing glass bodies of similar quality as those produced by deposition, but at substantially lower cost.

A drawback of prior art sol-gel methods is the bubble formation that is often observed on re-heating the consolidated glass, i.e., heating the glass at least to, but typically substantially above, the sintering temperature. Such re-heating occurs, for instance, during fiber drawing from a preform. Although the prior art knows some techniques for reducing or eliminating this bubbling, it is an object of this invention to provide an effective means for achieving this end that not only is compatible with existing sol-gel techniques but can lead to simpler and more economical treatment. It is a further object of the invention to reduce or prevent the pore formation that can occur on re-heating of VAD- or OVPO-formed glass. These and other objectives are achieved by introducing an effective amount of fluorine into the glass. Such treatment not only reduces or eliminates bubbling but also reduces glass viscosity, thus making possible processing at lower temperatures, and aids in sintering of the glass. Fluorine is also an index-lowering glass dopant that is useful in forming optical cladding material for optical fiber guide. Furthermore, introduction of fluorine assists in the removal of residual $OH^-$ groups from the silica.

The invention can be practiced in conjunction with any of the known methods for forming porous high-silica glass bodies, e.g., the sol-gel method, VAD, or OVPO, but the scope of the invention is not intended to be limited to the presently known methods. Known sol-gel methods are, for instance, the colloidal gel method, and the alkoxide hydrolysis method, as described, for instance, in U.S. Pat. No. 4,419,115, and the previously cited S. Sakka article, respectively.

The fluorine can be introduced at any convenient point of the process prior to the re-heating step that could, in prior art bodies, produce bubbling. Typically, the introduction occurs prior to completion of sintering of the glass, for instance, during gel preparation, after formation of the gel body (e.g., by impregnation of the undried body), after drying of the gel body (e.g., by impregnation of the unsintered or partially sintered body), or by exposure to gaseous reactants at temperatures below those required to sinter the dried gel, or during sintering.

A convenient method for producing a fluorine-containing gel is the introduction of a liquid or soluble solid (soluble in, e.g., water or alcohol) fluorine compound into the sol or gel. Exemplary compounds therefore are HF, $NH_4F$, and fluorinated hydrocarbons, e.g., tetraethyl ammonium fluoride hydrate.

Introduction of fluoride into an undried gel body, i.e., fluorine impregnation, can be by penetration of fluorine-containing liquid into the body. In addition to the categories of compounds mentioned in the previous paragraph, compounds soluble in chloroform or other liquid hydrocarbon can be advantageously used.

Into dried gel bodies, i.e., unsintered or partially sintered bodies, fluorine can advantageously be introduced by, in addition to the methods described above, contacting the body with fluorine or a gaseous fluorinecontaining compound. The same approach can be applied to the introduction of fluorine during heat treating or sintering of porous glass bodies produced by non-gel methods (e.g., VAD or OVPO). Exemplary compounds are fluorocarbons such as FREON, $CF_4$, $CF_{4-y}Cl_y$, ($0 \leq y \leq 3$) etc., fluorinated hydrocarbons, HF, $NH_4F$, and other inorganic fluorides such as $SiF_4$, $GeF_4$, $BF_3$, $PF_5$. The atmosphere typically consists of one or more fluorine compounds, in addition to other gases, e.g., diluents such as He, or reactants such as chlorine.

The fluorine concentration need not be uniform throughout the body formed according to the invention. Only parts of the body that are to be subjected to re-heating require the presence of fluorine, and furthermore, the concentration even in the fluorine-containing parts need not be uniform, provided, at the start of re-heating, an effective amount of fluorine (more than about 0.01%, typically more than 0.1% b.w.) is present everywhere therein. At least some fluorine typically is lost during heat treating, e.g., sintering or re-heating. An upper limit of fluorine content in high silica glass is about 5% b.w., typically due to the limited solubility of $F_2$ in high $SiO_2$ glass, as well as the thermodynamically favored reaction between $SiO_2$ and $F_2$ to form gaseous $SiF_4$ and $O_2$. These limits refer to fluorine incorporated into the glass prior to re-heating. A nonuniform fluorine distribution can produce a nonuniform refractive index distribution, and this may be used, for instance, in optical fiber manufacture.

We have discovered that the inventive method for preventing bubbling at reheating is particularly effective if the porous body had been contacted with chlorine, or a chlorine compound, prior to, or during, sintering. As is well known, sintering a porous silica body in a $Cl_2$ containing atmosphere results in the removal of OH from the body, and this is widely practiced in conjunction with VAD, OVPO, or sol-gel methods. It is, therefore, preferred to practice the inventive method on a high-silica body that is contacted, prior to completion of sintering, with chlorine or with a chlorine-containing compound. Typically, such contacting occurs during a heat treatment prior to sintering, or during sintering. As was described above, fluorine compounds can be introduced into the material of the porous body, or into the porous body, at any process step prior to completion of sintering.

As noted above, one technique for forming a silica-containing glass body is via the alkoxide gel method. This method involves mixing, i.e., reacting, a silicon-containing alkoxide such as tetraethyl orthosilicate (TEOS) with a water-containing solution. If a multi-component glass, i.e., a glass containing silica and oxides of one or more metals, is desired, then one or more alkoxides or soluble salts of these metals are also mixed with, for example, TEOS and the water-containing solution. Because TEOS (a liquid at room temperature and atmospheric pressure) is normally not miscible with water, mixing is achieved by, for example, dissolving the TEOS in a water-soluble solvent such as ethanol, and then adding the resulting TEOS-ethanol solution to the water-containing solution. Another alternative is to first add the ethanol to the water-containing solution, and then add the TEOS to the resulting water-ethanol solution. (Other variations are also useful.) If, however, the use of a water-soluble solvent such as ethanol is inconvenient, then mixing of the liquid, silicon-containing compound (TEOS) and water is achievable through the application of heat and/or ultrasound. (In this regard see M. Tarasevich, *Ceramic Bulletin*, 63 (1984) 500.)

It is believed that the above mixing results in hydrolysis of the silicon-containing alkoxide, as well as a polymerization/gelation process. Depending on a number of variables, the latter process yields either a silicacontaining, porous gel body (with the pores containing liquids such as water and ethanol), or a silica-containing powder which precipitates out of solution. In particular, the pH of the water-containing solution, which is readily altered through the addition of an acid such as HCl or a base such as $NH_4OH$, significantly affects the degree and speed of gelation, as well as the structure of the gelled product. For example, a relatively high pH, e.g., a pH ranging from about 8 to about 11, results in precipitation of a silicacontaining powder. At times, such high pH values initially result in the formation of a silica-containing powder suspended in solution, followed by the formation of a gel (which yields powder aggregates after drying). On the other hand, a relatively low pH, e.g., a pH ranging from about 0.5 to about 7, results in a gel body (although the introduction of fluoride ions, discussed below, can also lead to the formation of a powder precipitate or powder aggregates).

After the polymerization/gelation or powder precipitation step, a substantial portion of the liquids, e.g., water and ethanol, remaining within the pores of the resulting material is removed by drying this material. Drying typically involves exposing the material to temperatures ranging from about 20 degrees Centigrade (C.) to about 150 degrees C., and for a period of time ranging from about several hours to about several months. Further heating of the dried material, e.g., a dried gel body or dried gel pieces, to a sintering temperature (typically ranging from about 800 degrees C. to about 1500 degrees C.), frequently in a helium atmosphere, results in the formation of a corresponding densified, silica-containing glass body or glass pieces.

A major drawback of the above-described glass fabrication method is the fact that monolithic (prior to drying) gel bodies undergo cracking, and often fragmentation, during drying, the fragmentation yielding a plurality of dried gel pieces having individual masses smaller than a few (e.g., 2) grams. Sintering of cracked gel bodies or gel pieces merely produces silica-containing, cracked glass bodies, or (uncracked) glass pieces of small (smaller than about 2 grams) mass. This difficulty in forming crack-free, silica-containing glass bodies having masses larger than several (typically 2-3) grams has limited the economies of scale which would otherwise be achievable with this glass fabrication method.

Yet another major drawback of the above method is that the dried gel materials experience bubbling (of the same general type as described above in relation to reheating) during sintering as well as during reheating. The resulting bubble-containing glass bodies and/or pieces are generally undesirable for most applications.

Various modifications to the alkoxide gel method have been employed to limit the cracking and fragmentation of monolithic gel bodies during drying. In one technique, here denoted the slow-drying alkoxide gel method, the drying process is carried out very slowly over a period of months, at room temperature and atmospheric pressure. (See, e.g., M. Yamane et al., *Journal of Materials Science*, 13 (1978) 865.) In another technique, here denoted the autoclave method, drying is carried out in an autoclave at temperature and pressure conditions hypercritical (above the critical point) for liquids undergoing evaporation, over relatively short periods of time, e.g., several hours. (See, e.g., M. Prassas et al., *Journal of Materials Science*, 19 (1984) 1656.) While both techniques are potentially useful, the former technique is commercially disadvantageous because it requires an undesirably long drying time. Moreover, neither technique is capable of preventing bubbling during sintering or reheating.

One method, called the alkoxide-colloidal method, does not attempt to prevent cracking during drying of the (initially formed) gel, but still permits the fabrication of essentially crack-free, silica-containing glass bodies having masses as large as 150 grams. This method is described in U.S. Pat. Application Ser. No. 637,492 filed by D. W. Johnson, Jr., J. B. MacChesney, and E. M. Rabinovich on Aug. 3, 1984, which is hereby incorporated by reference. In accordance with this method, the cracked gel material or powder produced after relatively rapid drying (typically at 150 degrees C. for 1–2 days) is redispersed in a polar liquid, e.g., a water-containing liquid, to form a colloidal suspension (a sol) which is cast into a mold and again gelled to form a second gel body. (Typically, a blender or fused silica grinding media (ball milling) are employed during the redispersion to produce the colloidal suspension.) Essentially no cracking of the second gel body (released from the mold) occurs during drying (at room temperature for 2–3 days). Sintering has yielded essentially crack-free, silica-containing glass bodies having masses as large as 150 grams.

Although the alkoxide-colloidal method has proven to be highly useful, modifications have been sought which yield initial gel materials having reduced surface areas, e.g., gels having reduced pore surface areas or powder precipitates having reduced granule surface areas. (The Brunauer-Emmett-Teller (BET) surface area per unit mass of the initial gel materials employed in the alkoxide-colloidal method typically ranges from about 200 square meters per gram ($m^2/g$) to about 800 $m^2/g$ (although lower surface areas are also achievable). Regarding the BET method of measuring surface areas see, e.g., S. Lowell, *Introduction to Powder Surface Area* (Wiley, New York, 1979), page 20.) The logic underlying the goal of reducing surface area has been the belief that reduced-surface-area materials can be redispersed in reduced (compared to the amount used for redispersion of materials having higher surface areas) amounts of, for example, water which (together with larger pores) will facilitate the drying of larger gel bodies without cracking. This belief is based on the knowledge that a significant amount of the water in gels (formed after redispersion) is present in an adsorbed form on the surfaces of the pores. But, it is also known that large amounts of water in these pores lead to large water concentration gradients within the gel bodies during drying, which lead to a differential shrinkage of the gel bodies, which in turn lead to cracking of the gel bodies. Thus, it has been believed that reducing the surface area of the initially formed gel materials will lead to dried, essentially crack-free, monolithic gel bodies, and essentially crack-free, silica-containing glass bodies, having masses even larger than about 150 grams.

It has been found that the introduction of fluoride ions ($F^-$) into the alkoxide-water solution initially employed in the alkoxide-colloidal method, either before or during polymerization/gelation, yields initial (dried) gel materials of reduced surface area. Significantly, when these materials are dried at, for example, 150 degrees C., and then equilibrated with ambient air, they adsorb and retain significantly less amounts of water than gel materials formed in the absence of fluoride ions. Only a portion of this effect is attributable to the reduced surface areas. A contemplated explanation for the remainder is that much of this water reduction is due to a reduced hydrophilicity of the gel surface, also resulting from the presence of the fluoride ions. It is also believed that this reduced ability to adsorb water carries over into the monolithic gel body formed after redispersion of the initial gel materials in a polar liquid, e.g., a water-containing liquid, thus permitting a higher solid-to-liquid ratio in the later formed gel. As a consequence, dried, essentially crack-free, monolithic gel bodies and essentially crack-free, silica-containing glass bodies, having masses larger than about 150 grams, and even larger than about 200 grams, are now readily formed.

Not only does the presence of the fluoride ions prevent cracking during drying (of the gels produced by redispersion), but it also prevents bubbling both during sintering to glass and during reheating of the sintered glass. Significantly, it is believed that the two bubbling phenomena have different origins. That is, bubbling during reheating is believed due to the presence of chlorine, which is introduced prior to or during the sintering process, as described above. By contrast, bubbling during sintering is believed due to the release of water vapor and other volatile ingredients from within the dried gels.

It has also been found that the above advantageous results are achieved with any redispersion method, involving one or more redispersions, provided the initial gel material is formed by mixing a silicon-containing compound (capable of undergoing hydrolysis with formation of a gel or powder precipitate) in a liquid state or in solution with a water-containing solution. For example, useful initial gel materials or powders are formed through hydrolysis of silicon tetrachloride (a volatile liquid at room temperature and atmospheric pressure) in water which is either free of, or contains, alcohol.

It has further been found that the presence of fluoride ions in the alkoxide-water solutions employed in the alkoxide gel method (which is directed to forming monolithic bodies without redispersion) permits faster drying without cracking of the gel bodies. The fluoride ions also permit the preparation of larger, essentially crack-free bodies, and prevent bubbling both during sintering to glass and during any subsequent reheating of the glass.

Fluoride ions are expediently introduced in one embodiment into the water-containing solution, or into the silicon compound in a liquid state or in solution, or into the water solution-silicon compound liquid mixture (at the beginning of, or during, polymerization/gelation) by adding a soluble (in the particular solutions employed) fluorine-containing compound such as HF or $NH_4F$ to the water-containing solution, or silicon compound or liquid mixture. Useful amounts of fluoride ion range from about 0.5 grams of F (fluorine) per 100 grams $SiO_2$ (calculated as though all the silicon present were $SiO_2$) to about 40 grams of F per 100 grams of $SiO_2$. (For all practical purposes, F and $F^-$ have the same mass.) Quantities less than about 0.5 grams per 100 grams of $SiO_2$ are undesirable because they result in undesirably small reductions in pore surface areas. Quantities greater than about 40 grams per 100 grams of $SiO_2$ are undesirable because they result in undesirably rapid gelation, with formation of nonhomogeneous products. (The amounts of fluoride ion remaining within the dried gels or powders and resulting glass bodies are significantly less than those introduced into the original mixtures.)

By way of example, a fluoride-containing gel body or powder is readily fabricated by mixing TEOS dissolved in ethanol with a water solution containing dissolved HF and HCl. The ratio of the molar concentration of ethanol to that of TEOS usefully ranges from about 0.5 to about 10. On the other hand, the ratio of the molar concentration of water (where HF and HCl solutions are counted as water) to that of TEOS usefully ranges from about 2 to about 200. While not yet explored, it is believed that molar concentrations outside the above ranges may also be useful.

After the formation of an essentially crack-free glass body of appropriate mass, the glass body is further processed during conventional techniques, e.g., the body is reheated or machined, to form a desired glass article.

As discussed above, the dispersion of fluorinated, silicacontaining material (material containing silica and more than or equal to about 0.5 percent by weight of chemically bound fluorine), e.g., fluorinated, silica-containing, dried gel material or powder, in a polar liquid, such as water, results in gel bodies having many advantages. That is, the chemically bound fluorine serves to reduce (below what would occur in the absence of the fluorine) the surface area per unit mass of the dispersed material and, it is believed, make the surface of the dispersed material less hydrophilic. The gelation of this fluorinated material then makes possible the formation of dried, essentially crack-free, monolithic gel bodies and essentially crack-free, silica-containing glass bodies, having masses larger than about 150 grams. However, the presence of the chemically bound fluorine also increases the rate of gelation, i.e., gelation is often substantially complete within one minute, or even less than a minute, after the formation of the sol, which is sometimes inconvenient.

By contrast with the gelation of fluorinated material, the gelation (in a polar liquid) of silica-containing material, e.g., silica-containing, dried gel material or powder, which has not been fluorinated, and is thus essentially free of chemically bound fluorine, i.e., material having less than about 0.5 percnet (by weight) of chemically bound fluorine, proceeds at a relatively slow rate, with the rate of gelation decreasing as the surface area per unit mass of the material decreases. For example, the gelation, in water, of silica-containing material having a BET surface area per unit mass of 200 $m^2/g$ typically takes from about 2 to about 24 hours (depending on the amount of water), while the gelation of silica-containing material having a BET surface area per unit mass of about 50 $m^2/g$ typically takes at least one week, and often far more than a week. However, the dispersion and gelation (in a polar liquid) of unfluorinated, silica-containing material of relatively low BET surface area per unit mass, i.e., a BET surface area per unit mass equal to or less than about 100 $m^2/g$, and preferably less than or equal to about 50 $m^2/g$, is desirable because it makes possible the formation of dried, essentially crack-free, monolithic gel bodies and essentially crack-free, silica-containing glass bodies having relatively large masses (masses as large as, but no larger than, about 150 grams). (Unfluorinated, silica-containing material of relatively low surface area per unit mass is readily produced, for example, via the conventional alkoxide method or the alkoxide-colloidal method, and is also sold by, for example, the Cabot Corporation of Tuscola, Ill., under the trade name Cab-O-Sil.)

It has been found that dispersing a combination of fluorinated and unfluorinated silica-containing materials, i.e., either simultaneously dispersing fluorinated silica-containing and unfluorinated materials (in the form of, for example, a mixture) or sequentially dispersing fluorinated silica-containing and unfluorinated materials, in a polar liquid, leads to intermediate-duration gelation times (for the resulting sols) which That is, these gelation times are longer than those associated with the dispersal of only fluorinated materials, but shorter than those associated with the dispersal of only unfluorinated materials, e.g., these intermediate duration gelation times typically range from about 5 minutes to about 24 hours and preferably range from about 10 minutes to about 2 hours. Surprisingly, such gelation times are achieved even if the unfluorinated material, alone, takes weeks or even months to undergo gelation. In addition, it has been found that the duration of the gelation times is decreased as the fraction of the fluorinated material is increased. (The duration of the gelation of a sol, for purposes of the present disclosure, is defined by the instant in time subsequent to the formation of the sol when, by inclining the container holding the sol at an angle of 45 degrees to the vertical for 10 seconds, there is no visible flowing of the contents of the container, as perceived by the unaided human eye.)

The intermediate-duration gelation times achieved by using a combination of fluorinated and unfluorinated materials are advantageous because they are commercially convenient, i.e., convenient in relation to the commercial fabrication of silica-containing glass articles, such as optical fiber. For example, these intermediate-duration gelation times are sufficiently long so that sols are readily poured into molds, before the sols have gelled, within commercially convenient time periods after the formation of the sols, e.g., within minutes. In addition, these gelation times are sufficiently short so that the gelation process is typically not the ratelimiting factor in the fabrication of the silica-containing glass articles.

Significantly, the intermediate-duration gelation times are achieved using fluorinated material in combination with either (unfluorinated) relatively low specific surface area (as defined above) material or (unfluorinated) relatively high specific surface area material (material having a BET surface area per unit mass greater than about 100 $m^2/g$), as well as with (unfluorinated) material having significant variations in specific surface area. However, if the unfluorinated material is of relatively low BET surface area per unit mass (as defined above), then the resulting gelation process permits the ready formation of dried, essentially crack free, gel bodies and essentially crack free, silica-containing glass bodies, having masses larger than about 150 grams, and even larger than about 200 grams. Further, bubbling, both during sintering to glass and during reheating of the sintered glass, is avoided in all cases, i.e., is avoided irrespective of the specific surface area of the unfluorinated material.

The fluorinated, silica-containing material employed in combination with the unfluorinated material is readily produced, as discussed above, by, for example, introducing fluoride ions ($F^-$) into solutions yielding sols, or the sols themselves, formed by initially reacting a silicon-containing compound (capable of undergoing hydrolysis with formation of a gel or powder precipitate) in a liquid state or in solution, such as a silicon-containing alkoxide or silicon tetrachloride, with a water-containing solution. (The sol used to form the fluorinated, silica-containing material is hereafter referred to as the first sol.) The fluoride ions are conveniently introduced by adding a soluble (in the particular first sol employed), fluorine-containing compound, such as HF or $NH_4F$, to the first sol. Useful amounts of fluoride ion (in the first sol) range from about 0.5 grams of F (fluorine) per 100 grams of $SiO_2$ (calculated as though all the silicon present were $SiO_2$) to about 40 grams of F per 100 grams of $SiO_2$. Quantities of fluoride ion (in the first sol) less than about 0.5 grams of F per 100 grams of $SiO_2$ are undesirable because the resulting, fluorinated gel materials (when dispersed, in combination with unfluorinated materials, in a polar liquid to form what is hereafter referred to as the second sol) produce undesirably small reductions in gelation time, and are relatively hard and thus difficult to disperse. Quantities of fluoride ion (in the first sol) greater than about 40 grams of F per 100 grams of $SiO_2$ are unnecessary because the resulting gel materials suffer relatively large losses of fluoride ion ($F^-$) during drying, with the dried gel materials typically containing no more than about 10 grams of F per 100 grams of $SiO_2$. That is, increasing the fluoride ion content of the first sol above about 40 grams of F per 100 grams of $SiO_2$ has proven ineffective in achieving dried gel materials containing more than about 10 grams of F per 100 grams of $SiO_2$.

The amount of the fluorinated, silica-containing material, as a percentage of the total of the fluorinated and unfluorinated materials, ranges from about 3 percent (by weight) to about 60 percent. Amounts less than about 3 percent are undesirable because they produce an undesirably small decrease in gelation time. Amounts greater than about 60 percent are undesirable because they produce an undesirably large decrease in gelation time.

Consistent with the ranges given above, the amount of fluoride ion in the second sol produced by dispersing the combination of fluorinated and unfluorinated materials ranges from about (0.5 grams of F per 100 grams of $SiO_2$ x 3 percent =) 0.015 grams of F per 100 grams of $SiO_2$ to about (10 grams of F per 100 grams of $SiO_2$ x 60 percent =) 6 grams of F per 100 grams of $SiO_2$, with the low end of the range preferably being no less than about 0.2 grams of F per 100 grams of $SiO_2$. Quantities less than about 0.2 grams of F per 100 grams of $SiO_2$ are less desirable because they result in relatively long, commercially inconvenient gelation times, i.e., gelation times significantly longer than about 24 hours. Quantities greater than about 6 grams of F per 100 grams of $SiO_2$ are both difficult to achieve (because it is difficult to achieve more than about 100 grams of F per 100 grams of $SiO_2$ in the dried, fluorinated material) and undesirable because they produce an undesirably large decrease in gelation time, i.e., they produce a gelation time significantly less than about 5 minutes.

In the following examples, processing similar to that as described in U.S. Pat. No. 4,419,115 was generally used.

EXAMPLE 1

Fumed silica (grade M-5 from Cabot Corp.) was mixed with water (40:100 b.w.), the thus formed sol was dried at 150° C. and heat treated at about 800° C. 150 gms of the heat treated $SiO_2$ was again mixed with 270 gms of water and blended to form a second sol comprising aggregates of the original fumed silica particles. About 400 gm of the second sol was transferred to a borosilicate jar containing about 600 gm of $SiO_2$ cylinders (~½ inch diameter, ~½ inch long) and rolled on a mill for 5 hours, after addition of about 1% (b.w., based on the weight of the $SiO_2$ in the sol) of HF solution (about 50% HF in $H_2O$) to the contents of the jar. The milled sol was then cast into 11 mm ID $SiO_2$ tubes, allowed to gel overnight, the resulting gel rods were removed from the molds, dried, heat treated at 1000° C. in He+3% $Cl_2$ to remove bound water, and sintered at about 1400° C. in He. This procedure resulted in transparent glass rods containing an estimated amount greater than 0.1% b.w. of fluorine distributed throughout the body. Heating these rods to fiber drawing temperatures (>2000° C.) did not produce reboil. Identically prepared rods not containing fluorine showed serious reboil at these temperatures. Unless otherwise noted, in the following examples, processing substantially as described in Example 1 was used. In particular, the porous bodies were generally heat treated in a $Cl_2$ atmosphere prior to consolidation.

EXAMPLE 2

150 gm of once-dispersed and heat treated $SiO_2$, produced as in Example 1, was mixed with 203.5 gm $H_2O$ and 59.2 gm of a 4.5% b.w. solution of $H_2BO_3$ in $H_2O$, blended, transferred to a mill jar, 1.5 gm of HF added, milled for 19 hours, and cast into a concentric cylinder mold designed to yield a sintered gel glass tube of about 19 mm I.D., 25 mm O.D. After gelling, the body was removed, dried, and sintered. The resulting tube did not exhibit reboil at fiber drawing temperatures. The presence of HF also accelerated the gelling of the sol.

EXAMPLE 3

The same as Example 2, except that the HF was added after 5½ hours of milling.

EXAMPLE 4

2% b.w. fluorine and 4.8% $B_2O_3$ were added to a gel glass batch by blending together 100 gm once dispersed and dried fused $SiO_2$, 188.5 gm of 4.5% b.w. $H_3BO_3$ solution and 4 gm of HF.

EXAMPLE 5

Colloidal $SiO_2$ was produced by hydrolyzing tetraethylorthosilicate (TEOS), adding water thereto (150:220 gm), and milling for 18 hours. The resulting sol had low viscosity. 1.5 gm of HF was added to the mill jar, and milling continued for 1½ hours. The cast sol could be gelled overnight. Glass was produced from the gel body substantially as described.

EXAMPLE 6

90 gm of previously dispersed and dried colloidal silica (prepared substantially as described in Example 1) are mixed in a blender with 132 gm of distilled $H_2O$ in which 5.4 gm of $NH_4F$ had previously been dissolved, resulting in a gel containing 3% b.w. of fluorine. Glass was produced from the gel substantially as described.

EXAMPLE 7

A dried porous glass body was prepared substantially as described. The body was impregnated, prior to firing, by immersion in an aqueous 5.7% solution of $NH_4F$, and re-dried. This resulted in introduction of about 3% b.w. of F into the resulting dried gel.

EXAMPLE 8

The procedure was substantially as in Example 7, but the dried glass body was, prior to impregnation, partially sintered at 1000° C.

EXAMPLE 9

A porous glass body was prepared substantially as described, and fired in a furnace in the presence of several grams of $NH_4F$ powder, which produces a fluorine-containing atmosphere in the furnace.

EXAMPLE 10

Fluorine-free glass bodies were fired together with fluorine-containing glass bodies, produced substantially as in Example 6, the latter providing the fluorine-containing atmosphere for all the bodies.

EXAMPLE 11

1.8 gm of $NH_4F$ were dissolved in the water/ammonia mixture (pH = 11) prepared for hydrolysis of 312 gm (1.5 moles) of TEOS to provide a 1% b.w. fluorine admixture to the $SiO_2$ powder resulting from the hydrolysis. This powder was redispersed and a sintered glass body produced therefrom by a procedure substantially as described above.

The bodies of Examples 3-11 showed substantially no evidence of reboil upon heating to fiber drawing temperatures.

EXAMPLE 12

A porous glass body was produced by a method substantially as described. The body was lowered into a vertical furnace, heat treated (soaked) therein, raised, then lowered again for sintering. The heating program and the atmosphere (i.e., gas flow rates) in the furnace, for the inventive body, are given in Table I below under "Experiment 1". Also given in Table I are the data for a similarly produced body into which no fluorine was incorporated (Experiment 2). The "lowering" and "raising" times refer to the time taken to lower the body from the 100° C. zone to the hot zone, or raise the body from the hot zone to the 100° C. zone, respectively.

TABLE I

| | Lowering Raising (hr) | Soak (hr) | Atmosphere (cc/min) | | Temp. (°C.) |
|---|---|---|---|---|---|
| Exp.1 | Lowered | | He | 932 | 850 |
| | ¼ | | $Cl_2$ | 43 | |
| | | 16 | He | 932 | 850 |
| | | | $Cl_2$ | 43 | |
| | | 2 | He | 932 | 850 |
| | | | $SiF_4$ | 23 | |
| | raised | | He | 932 | 850 |
| | ¼ | | $SiF_4$ | 23 | |
| | lowered | | He | 932 | 1400 |
| | 2 | | $SiF_4$ | 23 | |
| Exp.2 | lowered | | He | 932 | 850 |
| | ¼ | | $Cl_2$ | 43 | |
| | | 16 | He | 932 | 850 |
| | | | $Cl_2$ | 43 | |
| | | 1½ | He | 1864 | 850 |
| | raised | | He | 1864 | 850 |
| | ¼ | | | | |
| | lowered | | He | 1864 | 1400 |
| | 2 | | | | |

In Experiment 1, where $SiF_4$ was used to introduce fluorine into the unsintered glass, no reboil was observed upon heating to 2200° C., whereas in Experiment 2 reboil occurred under these conditions.

EXAMPLE 13

A glass body was prepared substantially as in Example 12, Exp. 1, but with FREON 12 ($Cl_2F_2$) used instead of $SiF_4$. No evidence of reboil was found upon heating to 2200° C.

EXAMPLE 14

A porous silica body is produced by VAD substantially as described by K. Ishida et al. (op. cit.), and sintered at 1500° C. in He/$SiF_4$ atmosphere (97.6:2.4 by volume) for 2 hours. The resulting dense glass body is heated to 2200° C. No bubble formation is observed.

EXAMPLE 15

Two series of gels denoted, respectively, 1F and 7F, and containing, respectively, seven gels and five gels, were fabricated. Each gel was formed by dissolving TEOS in ethanol, and then pouring the resulting solution into water containing HCl and/or HF, while stirring. The compositions of the gels are given in Table II. (The first member of each series contained no HF, and thus no $F^-$.) The gels of the 1F series were made from starting mixes containing molar ratios of TEOS:ethanol:water of 1:4:4, with the number to the right of the series designation in Table II showing the concentration of starting fluoride (counted as F) in grams per 100 grams of $SiO_2$. The gels of the 7F series were made from starting mixes having molar ratios of 1:4:50, with the number to the right of the series designation having the same meaning as before. In defining the molar ratios for each series, HCl and HF were counted as water on a weight basis.

After pouring each of the TEOS-ethanol solutions into water:acid solutions, the resulting mixtures were stirred for 30 minutes or until too stiff to stir. The gelation of each TEOS-ethanol-water-HCl-HF solution, mixed at room temperature (without the application of external heat), took place over periods of time ranging from a few seconds to a month or more, depending on HF content (the greater the amount of HF, the faster the gelation).

All of the gels were aged without evaporation at 60 degrees Centigrade (C.) for about 24 hours, dried at 150 degrees C. for 2-3 days, and equilibrated with room air for several days.

The gels were then dried at 300 degrees C., and their BET surface areas were measured. The BET surface areas are listed in Table II.

Each of the gels dried at 150 degrees C. and equilibrated with room air was abraded into a flat plate having a thickness of 2-3 mm, weighed, and the infrared absorption spectrum of each flat plate was then measured (using spectrometer Model No. 683 sold by the Perkin-Elmer Corporation of Norwalk, Conn.). Each absorption spectrum exhibited absorption bands near 5292 $cm^{-1}$ due to the presence of water. The intensities of these absorption bands decreased as the corresponding fluoride concentrations increased.

The gels were then equilibrated with vacuum at room temperature, weighed, and infrared spectrum were obtained, as described above. The intensities of the absorption bands at 5292 $cm^{-1}$ were greatly decreased, indicating that nearly all of the water had been lost.

Quantitative estimates of the amount of water in each of the room-air-equilibrated samples were obtained from the intensities of the absorption bands at 5292 $cm^{-1}$ of the corresponding infrared spectra. This was achieved by using the Beer-Lambert law (see, e.g., W. G. Driscoll, Editor, *Handbook of Optics* (McGraw-Hill, New York, 1978), pp. 8-12) with an extinction coefficient of 67 for concentration in weight percent, thickness in centimeters, and the logarithm of intensity ratio to the base 10. This coefficient was measured by correlating the loss in weight of vacuum equilibrated gel samples with the corresponding decreases in absorbence at 5292 $cm^{-1}$. The quantitative estimates are listed in Table II.

As is evident from Table II, increasing fluoride concentrations in the initial mix lead to decreasing BET surface areas, and decreasing amounts of water in the resulting dried, room-air-equilibrated gels.

then dried, heat treated and sintered, as also described in Example 16.

TABLE II

| Sample | Additive, wt % of $H_2O$ | | BET Surface Area, $m^2/g$ | $H_2O$ wt % in Dried, Room-Air Equilibrated Samples | F-Content g/100 g $SiO_2$ | |
|---|---|---|---|---|---|---|
| | HCl | HF | | | added | analyzed (dried) |
| 1F0 | 1.07 | 0 | 549 | 5.0 | 0 | 0.0 |
| 1F1 | 0.40 | 0.83 | 408 | (not analyzed) | 1 | 0.8 |
| 1F2 | | 1.67 | 912 | 4.6 | 2 | 1.46 |
| 1F4 | | 3.33 | 757 | 4.0 | 4 | 2.45 |
| 1F8 | | 6.67 | 219 | 0.2 | 8 | 3.96 |
| 1F16 | | 13.34 | 154 | 0.095 | 16 | 6.14 |
| 1F32 | | 26.67 | 95 | 0.090 | 32 | (not analyzed) |
| 7F0 | 1.07 | 0 | 802 | 6.8 | 0 | 0.0 |
| 7F1 | 1.02 | 0.07 | 641 | 6.6 | 1 | 1.04 |
| 7F2 | 0.96 | 0.14 | 292 | 2.5 | 2 | 1.38 |
| 7F4 | 0.85 | 0.28 | 110 | 0.22 | 4 | 1.68 |
| 7F8 | 0.64 | 0.56 | 73 | <0.13 | 8 | 2.86 |

EXAMPLE 16

60 grams of fluorinated, silica-containing (dried) gel material, formed and dried as described in Example 15, and having the composition denoted 7F8 in Table II, was deposited in a 1-liter glass jar. 90 grams of unfluorinated, silica-containing (dried) gel material, having a BET surface area per unit mass of 50 $m^2/g$, was also added to the jar. This unfluorinated material was formed by initially reacting 1 mole of TEOS, dissolved in 4 moles of ethanol, with 4 moles of water containing 2.3 percent by weight of dissolved $NH_3$. The resulting (unfluorinated) gel was then aged and dried, as described in Example 15. 190 grams of deionized water was added to the fluorinated and unfluorinated gel materials in the glass jar.

The fluorinated and unfluorinated gel materials were dispersed in the water using ball milling. That is, 630 grams of fused silica milling cylinders (having diameters of 12 millimeters (mm) and lengths ranging from 12 to 15 mm) were placed within the glass jar, the jar was stoppered and then rotated at 80 revolutions per minute for about 24 hours. After this milling procedure, and over a period of time of about 10 minutes, the resulting sol was initially poured into a beaker through a 35 mesh screen to remove undispersed gel material, and was then poured into cylindrical glass molds which were 2.54 centimeters (cm) in diameter and 30 cm in length.

About 10 minutes after being poured into the molds, the sol within the molds visibly gelled to form gel rods which, after an additional 20 minutes, were removed from the molds. These gel rods were then dried in room-atmospheric conditions for 2–3 days, heat treated at 1000 degrees C. in an atmosphere of He and 3 percent $Cl_2$, and were sintered at 1400 degrees C., in He, for about 1 hour (as described in Examples 1 and 12), to produce quartz glass rods.

Conventional techniques were used to measure the refractive indices of the glass rods, from which it was inferred they contained about 1 percent by weight of fluoride ($F^-$) ions.

EXAMPLE 17

A sol was produced by dispersing 15 grams of fluorinated (7F8) and 135 grams of unfluorinated gel material in 190 grams of deionized water, as described in Example 16. After being poured into a beaker through a 35 mesh screen, and then poured into glass molds, the sol gelled after about 12 hours. The resulting gel rods were

What is claimed is:

1. A method for fabricating an article comprising silica-containing glass, the method comprising the steps of:
    dispersing silica-containing material in a polar liquid to form a sol;
    gelling said sol to form a gel body;
    treating said gel body with heat to form a silica-containing glass body; and
    completing the fabrication of said article, Characterized In That
    said silica-containing material includes at least a first portion containing chemically bound fluorine and a second portion which is essentially free of chemically bound fluorine, the duration of said gelling step ranging from about 5 minutes to about 24 hours.

2. The method of claim 1 further comprising the step of reacting at least a silicon-containing compound in a liquid state or in solution with a water-containing solution, with fluoride ions being present during at least a portion of the reaction between said compound and said water-containing solution, said reacting step leading to the formation of said first portion.

3. The method of claim 2 wherein the amount of said fluoride ions ranges from about 0.5 to about 40 grams of F per 100 grams of $SiO_2$.

4. The method of claim 1 wherein the amount of said first portion, as a percentage of the total of said first and second portions, ranges from about 3 percent by weight to about 60 percent by weight.

5. The method of claim 1 wherein the silica-containing material in said second portion has a BET surface area per unit mass less than or equal to about 100 $m^2/g$.

6. A method for fabricating an article comprising silicacontaining glass, the method comprising the steps of:
    dispersing silica-containing material in a polar liquid to form a sol;
    gelling said sol to form a gel body;
    treating said gel body with heat to form a silica-containing glass body; and
    completing the fabrication of said article, Characterized In That
    said silica-containing material includes at least a first portion containing chemically bound fluorine and a second portion which is essentially free of chemically bound fluorine, the amount of fluoride ion in said sol resulting from said dispersing step ranging from about 0.2 grams of F per 100 grams of $SiO_2$ to about 6 grams of F per 100 grams of $SiO_2$.

* * * * *

UNITED STATES PATENT AND TRADEMARK OFFICE
CERTIFICATE OF CORRECTION

PATENT NO. : 4,840,653
DATED : June 20, 1989
INVENTOR(S) : Eliezer M. Rabinovich It is certified that error appears in the above-identified patent and that said Letters Patent is hereby corrected as shown below:

Column 2, line 65, "highsilica" should read --high-silica--.
Column 2, line 68, "silicacomprising" should read --silica-comprising--.
Column 3, line 11, "silicacomprising" should read --silica-comprising--.
Column 4, line 52, "fluorinecontaining" should read --fluorine-containing--.
Column 5, line 19, "$Cl_2$containing" should read --$Cl_2$-containing--.
Column 5, line 58, "silicacontaining" should read --silica-containing--.
Column 5, line 68, "silicacontaining" should read --silica-containing--.
Column 9, line 3, "during" should read --using--.
Column 9, line 7, "silicacontaining" should read --silica-containing--.
Column 9, line 31, "percnet" should read --percent--.
Column 9, line 60, "silica-containing and unfluorinated" should read --and unfluorinated silica-containing--.
Column 9, line 62, "silica-containing and unfluorinated" should read --and unfluorinated silica-containing--.
Column 9, line 64, "sols) which That is," should read --sols). That is,--.
Column 11, line 40, "about 100 grams" should read --about 10 grams--.
Column 14, line 49, "spectrum" should read --spectra--.
Column 16, line 53, "silicacontaining" should read --silica-containing--.

Signed and Sealed this

Ninth Day of July, 1991

Attest:

HARRY F. MANBECK, JR.

Attesting Officer

Commissioner of Patents and Trademarks